United States Patent
Yoshigai

[11] 3,875,818
[45] Apr. 8, 1975

[54] BRAKE APPARATUS FOR BICYCLE

[75] Inventor: Kiyokazu Yoshigai, Osaka, Japan

[73] Assignee: Yoshigai Kikai Kinzoku Co., Ltd., Osaka, Japan

[22] Filed: June 12, 1974

[21] Appl. No.: 478,891

Related U.S. Application Data

[63] Continuation of Ser. No. 380,201, July 18, 1973, abandoned.

[52] U.S. Cl.................................................. 74/480 R
[51] Int. Cl....... G05g 11/00; B62k 23/06; B62l 3/02
[58] Field of Search.................. 74/480 R, 488, 489

[56] References Cited
UNITED STATES PATENTS

| | | | |
|---|---|---|---|
| 3,403,577 | 10/1968 | Ozaki | 74/489 X |
| 3,596,530 | 8/1971 | Yoshigai | 74/489 X |
| 3,719,104 | 3/1973 | Dian | 74/489 |
| 3,752,005 | 8/1973 | Yoshikawa | 74/489 X |
| 3,776,061 | 12/1973 | Yoshigai | 74/489 |

*Primary Examiner*—Allan D. Herrmann
*Attorney, Agent, or Firm*—Armstrong, Nikaido & Wegner

[57] ABSTRACT

A brake apparatus for bicycle having a drop handle including a straight bar portion and bent bar portions mounted on the bent bar portion. The apparatus comprises a clip band for embracing the bent bar portion, a mounting bracket having an opening, a main brake lever pivoted to the bracket and connected to one end of brake wire, and an auxiliary lever disposed at the inner side of the bracket and having portions extending in an L-form in parallel to the bent bar portion and straight bar portion respectively. The auxiliary lever is pivoted at its top on the head portion of the main brake lever and is supported by a link member having one end pivoted on the bracket and the other end pivoted on an intermediate portion of the auxiliary lever. The main brake lever is therefore pivotally movable through a greater angle than the auxiliary lever to minimize the distance the distal end of the auxiliary lever moves, rendering the distal end readily accessible by the rider to assure an easy and quick braking action.

4 Claims, 5 Drawing Figures

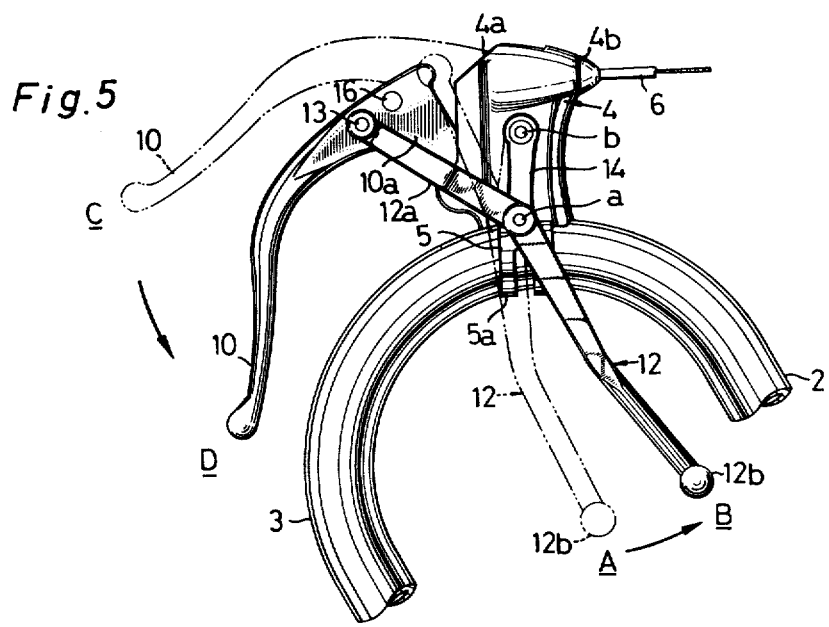

BRAKE APPARATUS FOR BICYCLE

This is a continuation of application Ser. No. 380,201, filed July 18, 1973, and now abandoned.

BACKGROUND OF THE INVENTION

The present invention relates to a brake for bicycles, more particularly to a brake apparatus for bicycles of the drop handle type.

It is known that steering handles of bicycles are generally grouped into three types, i.e. up handle, flat handle and drop handle.

Among these, the drop handle is used for racing bicycles which are adapted for high speed cycling as in track racing and road racing as well as for touring bicycles for cycling a long distance. The drop handle assures stable and efficient cycling free of fatigue because of its functional form which enables the rider to grasp the handle at a selected position and in an optimum posture suitably determined depending upon cycling purposes and cycling conditions as when the speed is changed from low to high or when going up a slope.

The drop handle comprises an approximately horizontal straight bar portion mounted on a fork stem of the front wheel and extending substantially at right angles to the fork stem and bent bar portions projecting forward from the opposite ends of the straight bar portion and bent in a U-like shape.

As well-known, the brake lever is mounted approximately at the middle of the bent bar portion or at a slightly upper part thereof by means of a bracket. In the case where the brake lever is mounted at such specific position, the hand grasping the handle at the desired portion thereof in accordance with cycling purposes and conditions peculiar to the drop handle may possibly be inaccessible to the brake lever depending upon where the hands are positioned on the handle. Accordingly, when there arises a need to apply the brake, the hand has to be removed from the handle to operate the brake lever or the hand on the handle has to be shifted to operate the brake lever. Thus the rider must operate the brake in an unstable posture and, in an emergency, may fail to apply the brake with the appropriate timing with the possiblity that the bicycle will fall or collide with another vehicle.

A brake apparatus for bicycles of the drop handle type has been proposed as disclosed in U.S. Pat. No. 3,403,577 (granted to the present applicant) which includes an auxiliary lever operatively associated with the brake lever on the drop handle so as to make it sure all the time that the brake lever can be operated by the hand which is grasping the drop handle at the desired portion thereof. This type of apparatus has so far won popularity.

More specifically, the improved brake apparatus principally comprises a clip band for securing the apparatus to the handle, a bracket, a main brake lever, and an auxiliary lever.

The bracket is in the form of a box having an opening from which the opposite side walls of the main brake lever head are inserted. The auxiliary lever, approximately L-shaped, is attached to one side wall of the bracket. The bracket and the levers are supported on a lever pin extending therethrough and mounted in place by means of a bushing, a fastening pin and a lock member, whereby the main brake lever and auxiliary lever are pivotably supported on the lever pin. The auxiliary lever is formed at its front end with a coupling piece which is directly pivotally connected to the engageable head of the brake lever or is interposed between the head and the cylindrical guide portion of the bracket. The distal end of the auxiliary lever is bent at its intermediate portion to extend in parallel to the straight bar portion.

Thus, when the brake is to be applied by the hand grasping the straight bar portion of the handle, the fingers can be placed on that portion of the auxiliary lever which is in parallel to the straight bar portion of the handle, without the necessity of removing the hand from the grasped portion. It is therefore possible to turn the coupling piece forward about the lever pin (fastening pin) and to operate the main brake lever forward about the lever pin. However since the improved brake apparatus includes the main brake lever and the auxiliary lever which are pivotally movable about the same lever pin, i.e. common support point for pivotal movement, the auxiliary lever, when pivotally moved through an angle, causes the main brake lever to rotate through the same angle. To rotate the main brake lever through an angle required for braking, the distal end of the auxiliary lever (i.e. the portion parallel to the straight bar portion of the handle) that is remote from the support point must move a great distance.

Consequently, the distal end of the auxiliary lever will be separated from the straight bar portion of the handle by a great distance. Although this may not be a problem with bicycles such as racing bicycle for adults having relatively long fingers, the auxiliary lever can not be operated as intended when mounted on bicycles for children having relatively short fingers.

SUMMARY OF THE INVENTION

A main object of this invention is to provide a brake apparatus for a bicycle of the drop handle type including a main brake lever and a separate auxiliary lever which are pivotally movable about different support points so that the main brake lever is pivotally movable through a greater angle than the auxiliary lever to minimize the distance the distal end of the auxiliary lever moves, permitting the distal end to be positioned close to the straight bar portion of the handle and thereby enabling the rider to operate the distal end of the auxiliary lever while he is grasping the straight bar portion of the handle so as to insure that the main brake lever can be operated in operative relation to the auxiliary lever.

Another object of this invention is to provide a brake apparatus in which the auxiliary lever is operable with an extremely small force, causing the main brake lever to apply the brake quickly upon the operation of the auxiliary lever in operative relation thereto for a quick braking action.

Other objects and advantages of this invention will become apparent from the following description of an embodiment with reference to the accompanying drawings showing a brake apparatus on the right hand only as an example.

BRIEF DESCRIPTION OF THE DRAWINGS

FIG. 5 is a side elevation showing the apparatus before and after operation.

DESCRIPTION OF THE PREFERRED EMBODIMENT

Figure 1:
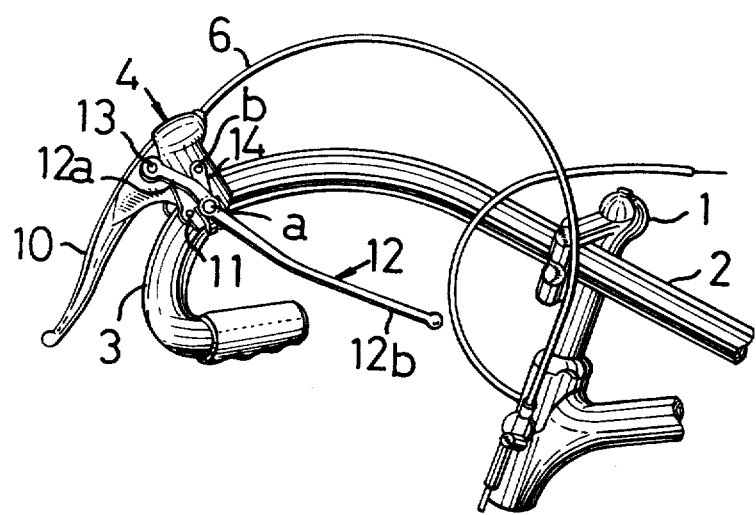
FIG. 1 is a perspective view showing a brake apparatus of this invention as it is mounted on the right-hand side of a drop handle.
Figure 2:
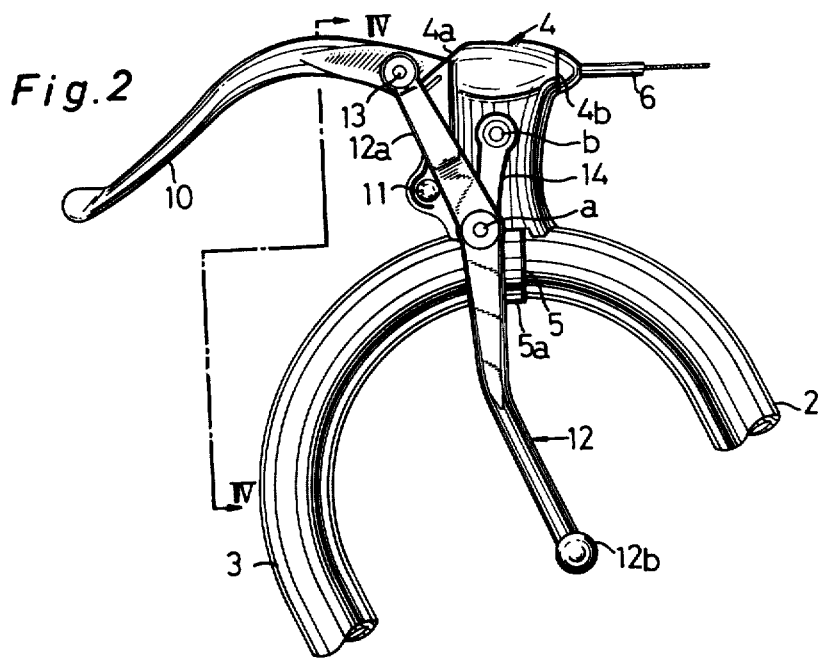
FIG. 2 is an enlarged side elevation of the same.

With refernce to the drawings, particularly to FIGS. 1 to 4, a drop handle mounted on a fork stem 1 comprises a straight bar portion 2 positioned substantially horizontally at right angles to the fork stem 1 and bent bar portions 3 respectively extending forward from the opposite ends of the straight bar portion 2 in an approximate U-form respectively.

The braking apparatus of this invention is mounted on the bent portion 3 approximately at its midportion by means of a bracket 4 and a clip band 5. The bracket 4 is in the form of a box having a front opening 4a and a hole 4b in its rear top portion for passing a brake wire 6.

Figure 3:
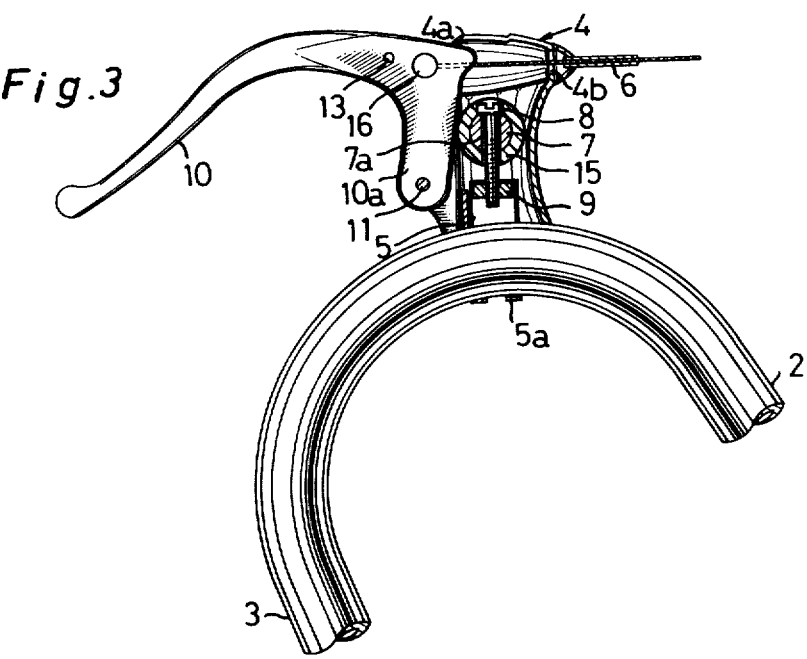
FIG. 3 is a side elevation in section showing the same.

The bracket 4 supports a fastening pin 7 extending through its opposing side walls transversely thereof. The inside portion of the fastening pin 7 is substantially exposed from the left side wall. The fastening pin 7 is formed, at its approximate midportion, with a screw hole 7a extending at right angles to the axis of the pin and accommodating a screw 8 as seen in FIG. 3. The distal end of the screw 8 is driven into a threaded hole in a seat plate 9 at the top of the clip band 5 to force up the band 5 embracing the bent rod portion 3, whereby the looped portion 5a of the band is fastened to the bent rod portion. Under the fastening pin 7 in the front thereof, a main brake lever 10 is pivoted on the bracket 4. The lever 10 has a head to which the inner wire of the brake wire 6 is connected as already known and from which a support member 10a extends substantially downward. The head is inserted into the bracket 4 through the opening 4a, and a lever pin 11 extends transversely through the bracket 4 and the support member 10a therein. The main lever 10 is supported on the lever pin 11 for pivotal forward and backward movement to cause the brake wire 6 to press the brake shoes against the rim to produce a braking action.

Figure 4:
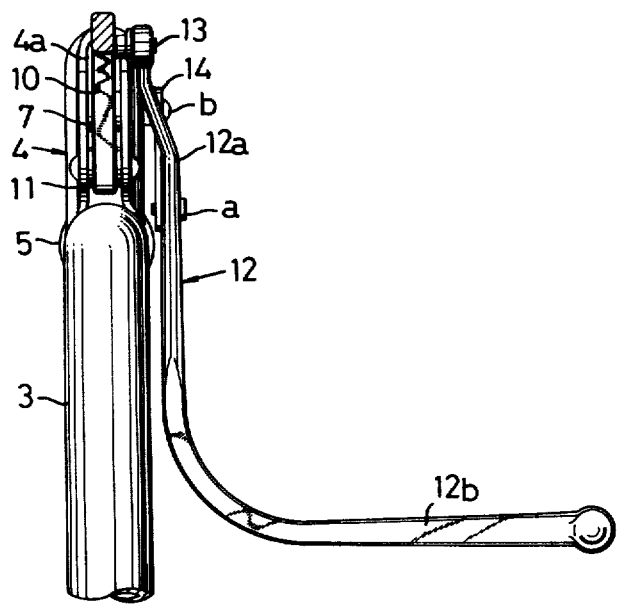
FIG. 4 is a view as seen in the direction of the arrows IV—IV in FIG. 2.

Indicated at 12 is an auxiliary lever comprising a portion 12a in parallel with the bent rod portion 3 of the handle and another portion 12b in parallel with the straight portion 2 of the handle, the portions 12a and 12b being approximately L-shaped as shown in FIG. 4. The top end of the portion 12a, namely the head of the lever 12, is pivoted as at 13 to the inner side of head of the main lever 10. As apparent from the side elevation of FIG. 2, the portion 12a including the head is bent forward as at a. A link member 14 pivotally movable back and forth extends between and is supported on the portion a and the exposed inside portion b of the fastening pin 7 respectively.

Accordingly, when the main brake lever 10 is grasped and moved pivotally forward about the pin 11, the brake wire 6 will be pulled to effect a usual braking action. At this time, the forward pivotal movement of the main lever 10 causes the auxiliary lever 12 to turn in the same direction which lever 12 is directly pivoted to the main lever 10. Inasmuch as the main lever 10 and the auxiliary lever 12 are movable about different support points, the link member 14 is provided to move pivotally about the portion b, with one end of the member 14 pivoted to an intermediate portion of the auxiliary lever 12. The rotation of the main lever 12 therefore moves the link member 14 slightly in the same direction about the portion b, the link member 14 thus coupling both levers 10 and 12 in operative relation.

When the hand grasping of the main brake lever 10 is difficult as when the straight bar portion 2 of the handle is grasped or the bent rod portion 3 is grasped at the upper side of the bracket 4 proximate to the straight bar portion 2, the auxiliary lever 12 will be manipulated to operate the main lever 10 as seen in FIG. 5. Since the auxiliary lever 12 comprises the portions 12a and 12b which are L-shaped substantially in parallel to the bent bar portions 3 and straight bar portion 2 respectively, the main lever 10 can be actuated by operating the portion 12a or 12b with a much smaller force than when the main lever 10 is directly operated. Especially according to this invention, the restraining relation between the main brake lever 10 and the auxiliary lever 12 due to the construction in which the two levers 10 and 12 are pivotable about different support points and the provision of the pivotal link member 14. Thus when the auxiliary lever 12 is rotated a specified angle the link member 14 also moves pivotally, increasing the angle of rotation of the main lever 10 by an amount corresponding to the amount of pivotal movement of the link member 14. Consequently, even when rotated a small angle, the auxiliary lever 12 permits the main lever to rotate through an angle required for braking. Because the lever 12 need only be rotated a small angle, the portion 12b of the auxiliary lever 12 that is remote from its support point will move a small distance in proportion to the angle, so that the auxiliary lever 12 can be mounted on the inner side of the bracket 4 in proximity to the straight bar portion 2 of the handle. This enables the rider to manipulate the portion 12b while he is grasping the straight bar portion to cause the main lever 10 to pull the brake wire 6 in operative relation thereto. When used on a bicycle for children having short fingers, therefore, the brake apparatus assures a braking operation with high safety.

Thus according to this invention, the angle of rotation of the main lever 10 is greater by an amount corresponding to the amount of pivotal movement of the link member 14 than in the case where the main lever 10 and auxiliary lever 12 are supported on the same pivot. It therefore follows that if the auxiliary lever is moved from position A to position B as seen in FIG. 5, the main lever 10 will move faster from position C to position D, permitting the brake to function quickly, hence advantageous when an instantaneous braking action is necessary. In this way the auxiliary lever 12 is fully serviceable as intended.

When the auxiliary lever 12 and main brake lever 10 are freed from operation, the lever 12 and the lever 10 connected at its head to the inner wire of the brake wire 6 will return to the original position. To insure that the main brake lever 10 will stop at the position C at this time, the fastening pin 7 is covered with a nylon cylinder member 15 as seen in FIG. 3. The head face of the main brake lever 10 is adapted to contact the outer periphery of the cylinder member 15, such that the rider can place his fingers on the main lever 10 while grasping the bent bar portion 3. The main lever 10 is made of an integral plate and has a wire connector 16 which is exposable from the bracket 4 when the lever 10 is pivotally moved about the lever pin 11 so as to make it easy to connect the inner wire of the wire 6 to the head.

If the support point (i.e. the portion *a*) of the auxiliary lever 12 for the link member 14 is made shiftable, the support point of the auxiliary lever 12 for pivotal movement will also be rendered shiftable, this making it possible to alter the angle of rotation of the main lever 10. In this case, the link member 14 will of course have a different length.

It will be apparent from the foregoing description that, with this invention, the brake can be actuated with a small force utilizing the portions 12*a* and 12*b* of the auxiliary lever 12, without the need to remove the hand from the handle even if it is grasping the handle at such position that the fingers are inaccessible to the main lever 10. Moreover, the manipulation of the portions 12*a* and 12*b* causes the main lever 10 to move pivotally through an angle which is greater than otherwise by an amount corresponding to the amount of pivotal movement of the link member 14. The portion 12*b* which is positioned close to the straight bar portion 2 enables the rider to grasp the auxiliary lever 12 with an increased force when actuating the auxiliary lever 12, this ensuring a reliable operation and affording a great advantage to those having short fingers as well as to adults having long fingers. In addition, the increase in the rotational angle of the main lever 10 resulting from the manipulation of the auxiliary lever 12 permits the brake to function quickly, with the consequent advantage that a quick and reliable braking effect can be achieved in an emergency.

What is claimed is:

1. A brake apparatus for a bicycle having a drop handle including a straight bar portion and bent bar portions to be mounted on the bent bar portion comprising a clip band for embracing the bent bar portion having a seat plate, a mounting bracket having an opening, a main brake lever having a head inserted into the bracket from the opening and connected to one end of an actuating wire, and an auxiliary lever disposed at the inner side of the bracket and having portions extending in an L-form in parallel to the bent bar portion and the straight bar portion respectively, the bracket supporting a fastening pin extending therethrough in a transverse direction and having a hole for inserting a screw, the screw extending through the hole and being driven into the seat plate of the clip band to fasten the clip band to the bent bar portion, the main brake lever being supported on the bracket at a position under the fastening pin in front thereof so as to be pivotally movable forward and backward, the auxiliary lever being pivoted at its head to a head portion of the main brake lever and supported at the inner side of the bracket by a link member, the link member being pivotally movable forward and backward and having one end pivoted to the fastening pin and the other end pivoted to an intermediate portion of the auxiliary lever.

2. A brake apparatus for a bicycle having a drop handle including a straight bar portion and bent bar portions said brake apparatus including a mounting bracket; a main brake lever pivotally mounted to said bracket, said main brake lever being connected to a brake cable; an L-shaped auxiliary lever having a first portion parallel to said bent bar portion and a second portion parallel to said straight portion, said first portion being coupled to said main brake lever; and a link member wherein said link member is pivotally mounted to said bracket and said auxiliary lever is pivotally mounted to said link member whereby the rotation of said auxiliary lever causes a proportionally greater rotation of said main brake lever.

3. The brake apparatus of claim 2 wherein the first portion of said auxiliary member is mounted pivotally to said link member.

4. The apparatus of claim 2 including a fastening pin positioned within said bracket and extending therefrom, said link member being mounted on said bracket by means of said fastening pin.

* * * * *